United States Patent
Rajagopalan et al.

(10) Patent No.: US 11,989,677 B2
(45) Date of Patent: May 21, 2024

(54) FRAMEWORK FOR EARLY WARNING OF DOMAIN-SPECIFIC EVENTS

(71) Applicant: ViANAI SYSTEMS, INC., Palo Alto, CA (US)

(72) Inventors: Sanjay Rajagopalan, Palo Alto, CA (US); Xiwei Zhou, Mountain View, CA (US)

(73) Assignee: VIANAI SYSTEMS, INC., Palo Alto, CA (US)

( * ) Notice: Subject to any disclaimer, the term of this patent is extended or adjusted under 35 U.S.C. 154(b) by 94 days.

(21) Appl. No.: 17/179,197

(22) Filed: Feb. 18, 2021

(65) Prior Publication Data
US 2022/0261732 A1    Aug. 18, 2022

(51) Int. Cl.
*G06Q 10/06* (2023.01)
*G06F 16/35* (2019.01)
(Continued)

(52) U.S. Cl.
CPC ..... *G06Q 10/06375* (2013.01); *G06F 16/355* (2019.01); *G06F 16/358* (2019.01);
(Continued)

(58) Field of Classification Search
CPC .......... G06Q 10/06375; G06Q 10/0635; G06F 16/358; G06F 16/355; G06F 40/35; G06N 20/00
See application file for complete search history.

(56) References Cited

U.S. PATENT DOCUMENTS

| 11,232,383 B1* | 1/2022 | Burns, Sr. .......... G06Q 10/0637 |
| 2016/0196516 A1* | 7/2016 | Anisingaraju ..... G06Q 10/0635 705/7.28 |

(Continued)

FOREIGN PATENT DOCUMENTS

| WO | WO-2018050968 A1 * | 3/2018 | .............. B25J 13/00 |
| WO | WO-2019050968 A1 * | 3/2019 | .............. B25J 13/00 |

OTHER PUBLICATIONS

Michelson M, Macskassy SA. Discovering users' topics of interest on twitter: a first look. InProceedings of the fourth workshop on Analytics for noisy unstructured text data Oct. 26, 2010 (pp. 73-80). (Year: 2010).*

(Continued)

*Primary Examiner* — Hamzeh Obaid
(74) *Attorney, Agent, or Firm* — Artegis Law Group, LLP (57) ABSTRACT

One embodiment of the present invention sets forth a technique for processing unstructured data. The technique includes applying one or more machine learning models to a set of candidate topics extracted from the unstructured data to determine a set of activities of interest included in the set of candidate topics. The technique also includes generating a set of scores for the activities of interest, wherein each score included in the set of scores represents an estimated impact of a corresponding activity of interest on operations within a domain. The technique further includes determining one or more activities included in the set of activities of interest based on a ranking of the activities of interest by the scores, and causing one or more alerts to be outputted in a user interface, wherein each of the alerts is associated with a potential event related to the one or more activities.

20 Claims, 4 Drawing Sheets

(51) Int. Cl.
    *G06F 40/35*          (2020.01)
    *G06N 20/00*          (2019.01)
    *G06Q 10/0635*       (2023.01)
    *G06Q 10/0637*       (2023.01)

(52) U.S. Cl.
    CPC .............. *G06F 40/35* (2020.01); *G06N 20/00* (2019.01); *G06Q 10/0635* (2013.01)

(56) References Cited

U.S. PATENT DOCUMENTS

| | | | |
|---|---|---|---|
| 2016/0371618 A1* | 12/2016 | Leidner | G06F 16/2246 |
| 2017/0039486 A1* | 2/2017 | Simard | G06F 16/951 |
| 2018/0082183 A1* | 3/2018 | Hertz | G06Q 10/10 |
| 2018/0374010 A1* | 12/2018 | Burde | G06N 5/045 |
| 2019/0332666 A1* | 10/2019 | Dadachev | G06F 40/284 |
| 2019/0354544 A1* | 11/2019 | Hertz | G06Q 10/0637 |
| 2020/0097879 A1* | 3/2020 | Venkata | G06N 20/00 |
| 2020/0356676 A1* | 11/2020 | Gorlamandala | G06F 21/577 |
| 2021/0256545 A1* | 8/2021 | McLaughlin | G06Q 30/0203 |

OTHER PUBLICATIONS

International Search Report for Application No. PCT/US2022/016834 dated May 11, 2022.

* cited by examiner

S.B. 717 will increase the maximum amount of time that medical professionals can devote towards giving expert witness testimony in trials from 15 percent to 20 percent.

ARG0: "S.B. 717",

ARG1: "the maximum amount of time that professionals can devote towards giving expert witness testimony in trials from 15 percent to 20 percent", ARGM-MOD: "will", V: "increase",

Severity score: -1

Category: expert witness

Domain: legal

FRAMEWORK FOR EARLY WARNING OF DOMAIN-SPECIFIC EVENTS

BACKGROUND

Field of the Various Embodiments

Embodiments of the present disclosure relate generally to machine learning and data processing, and more specifically, to a framework for early warning of domain-specific events.

Description of the Related Art

Entities typically analyze large volumes of data related to past performance to identify risks and develop strategic and operational plans related to the entities' future activities. For example, a company could estimate the lead time for ordering raw materials used to manufacture a product based on records of lead times for the company's prior orders for the raw materials. The company could also estimate the amount of raw materials to order based on prior demand for the product and/or the manufacturing capacity or lead time for the product. The company could then place subsequent orders for the raw materials to ensure that the company is able to meet commitments for manufacturing and delivering the product to the company's customers.

However, conventional techniques or models for planning or risk assessment are unable to account for unforeseen events that can disrupt normal operation. Continuing with the above example, the company's orders for raw materials could be delayed because of weather, natural disasters, supply chain issues, or geopolitical incidents. Because these types of events are not found in logs, records, or other data that is used by the company for planning purposes, the company could fail to detect both the events and the events' impact on the company's operations. When one of these events occurs, the company could be unable to receive the raw materials in a timely manner, which in turn could disrupt the company's manufacturing operations, prevent the company from fulfilling its commitments to customers, and result in a loss of revenue or damage to the company's reputation.

As the foregoing illustrates, what is needed in the art are techniques for efficiently and effectively analyzing data for the purposes of identifying and flagging events that are potentially disruptive to operations in various domains.

SUMMARY

One embodiment of the present invention sets forth a technique for processing unstructured data. The technique includes applying one or more machine learning models to a set of candidate topics extracted from the unstructured data to determine a set of activities of interest included in the set of candidate topics. The technique also includes generating a set of scores for the activities of interest, wherein each score included in the set of scores represents an estimated impact of a corresponding activity of interest on operations within a domain. The technique further includes determining one or more activities included in the set of activities of interest based on a ranking of the activities of interest by the scores, and causing one or more alerts to be outputted in a user interface, wherein each of the alerts is associated with a potential event related to the one or more activities.

One technical advantage of the disclosed techniques relative to the prior art is that activities are automatically identified as potentially relevant to operations within a given domain via operations that efficiently process and filter a large corpus of unstructured data. The disclosed techniques thus allow warnings or alerts of the activities to be generated in a timely manner instead of performing time- or resource-intensive operations such as analyzing the entire corpus of unstructured data using one or more machine learning models and/or human reviewers. Another technical advantage of the disclosed techniques is the ability to adapt techniques or machine learning models used to process and filter the unstructured data to different domains and/or the ability to improve the accuracy of the alerts based on minimal user feedback. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
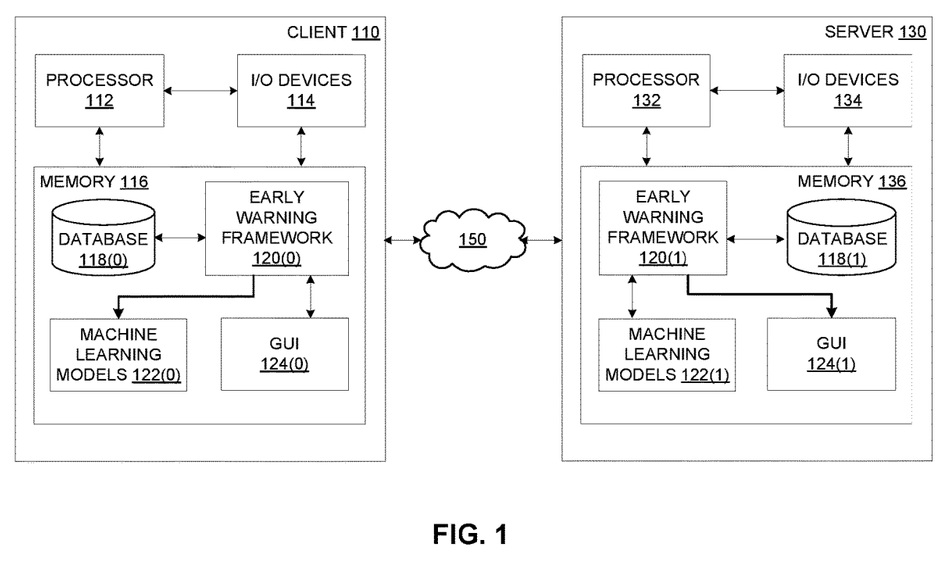
FIG. 1 illustrates a system configured to implement one or more aspects of the various embodiments.

FIG. 1 illustrates a system configured to implement one or more aspects of the various embodiments. As shown, the system includes client 110 and server 130 coupled together via network 150. Client 110 or server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others. Client 110 and server 130 are configured to communicate via network 150.

As further shown, client 110 includes processor 112, input/output (I/O) devices 114, and memory 116, coupled together. Processor 112 includes any technically feasible set of hardware units configured to process data and execute software applications. For example, processor 112 could include one or more central processing units (CPUs), one or more graphics processing units (CPUs), and/or one or more parallel processing units (PPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118(0), an early warning framework 120(0), one or more machine learning models 122(0), and a graphical user interface (GUI) 124(0). Database 118(0) is a file system and/or data storage application that stores various types of data. Early warning framework 120(0) is a software application that, when executed by processor 112, interoperates with a corresponding software application executing on server 130 to generate, analyze, evaluate, and describe one or more machine learning models. Machine learning models 122(0) include one or more artificial neural networks, support vector machines, regression models, tree-based models, hierarchical models, ensemble models, and/or other types of models configured to perform general-purpose or specialized artificial intelligence-oriented operations. GUI 124(0) allows a user to interface with early warning framework 120(0).

Server 130 includes processor 132, I/O devices 134, and memory 136, coupled together. Processor 132 includes any technically feasible set of hardware units configured to process data and execute software applications, such as one or more CPUs, one or more GPUs, and/or one or more PPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes database 118(1), early warning framework 120(1), machine learning models 122(1), and GUI 124(1). Database 118(1) is a file system and/or data storage application that stores various types of data, similar to database 118(0). Early warning framework 120(1) is a software application that, when executed by processor 132, interoperates with early warning framework 120(0) to analyze, process, and describe events in unstructured data stored in databases 118(0) and 118(1). Machine learning models 122(1) include one or more artificial neural networks, support vector machines, regression models, tree-based models, hierarchical models, ensemble models, and/or other types of models configured to perform general-purpose or specialized artificial intelligence-oriented operations. GUI 124(1) allows a user to interface with early warning framework 120(1).

As a general matter, database 118(0) and 118(1) represent separate portions of a distributed storage entity. Thus, for simplicity, databases 118(0) and 118(1) are collectively referred to herein as database 118. Similarly, early warning frameworks 120(0) and 120(1) represent separate portions of a distributed software entity that is configured to perform any and all of the inventive operations described herein. As such, early warning frameworks 120(0) and 120(1) are collectively referred to hereinafter as early warning framework 120. Machine learning models 122(0) and 122(1) likewise represent a distributed machine learning model and are collectively referred to herein as machine learning model 122. GUIs 124(0) and 124(1) similarly represent distributed portions of one or more GUIs and are collectively referred to herein as GUI 124.

In operation, early warning framework 120 uses one or more machine learning models 122 to analyze unstructured data from database 118 and/or another data store. Early warning framework 120 also uses the output of machine learning models 122 to identify events that are potentially disruptive to operations related to one or more domains. When such a potentially disruptive event is identified, early warning framework 120 may output an alert representing an "early warning" of the event in GUI 124 to allow users that perform operational planning or risk assessment in the corresponding domain to respond to the event. Early warning framework 120 may also, or instead, receive user feedback indicating the relevance of the early warning to operations or risk within the domain. Early warning framework 120 may then retrain one or more machine learning models 122 using labels generated from the user feedback, thereby improving the performance of machine learning models 122 in generating early warning predictions over time.

Framework for Early Warning of Domain-Specific Events

Figure 2:
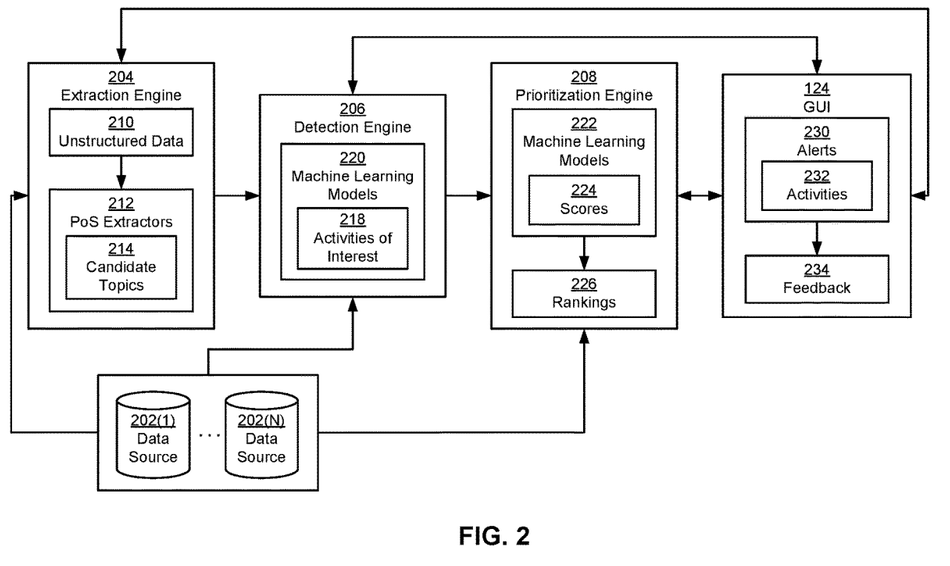
FIG. 2 is a more detailed illustration of the early warning framework of FIG. 1, according to various embodiments.

FIG. 2 is a more detailed illustration of early warning framework 120 of FIG. 1, according to various embodiments. As shown, early warning framework 120 includes an extraction engine 204, a detection engine 206, and a prioritization engine 208 coupled to GUI 124 and a number of data sources 202(1)-(N). Each of these components may execute on client 110 and/or server 130 and is described in further detail below.

Extraction engine 204, detection engine 206, prioritization engine 208, GUI 124, and/or other components of early warning framework 120 retrieve and/or analyze a collection of unstructured data 210 from one or more data sources 202(1)-(N), each of which is referred to individually as data source 202. In one or more embodiments, data sources 202 include public, private, and/or external sources of data. One or more data sources 202 can include data that is typically not used for planning or risk assessment purposes. One or more data sources 202 can additionally include unstructured data 210 that is not domain-specific or restricted to specific entities (e.g., users, companies, locations, etc.). For example, data sources 202 could include one or more social media databases, cloud storage systems, news sources, governmental data sources, application programming interfaces (APIs), email servers, internal databases, and/or other repositories or services for collecting, storing, or providing data.

Unstructured data 210 from data sources 202 includes posts, updates, comments, advertisements, articles, reviews, images, audio, video, sensor readings, financial data, and/or other records or content. Unstructured data 210 may lack a standardized or uniform structure and may be generated or published in a real-time, near-real-time, periodic, or continuous basis. When unstructured data 210 includes non-text-based content, a speech-recognition technique, optical character recognition (OCR) technique, object detection technique, and/or another technique for extracting textual information from other types of data may be used to convert the content into a text-based representation.

Unstructured data 210 may optionally be collected from data sources 202 and aggregated into one or more databases 118. For example, thousands to billions of records could be queried, scraped, and/or otherwise retrieved from data sources 202 on a periodic (e.g., every minute, hour, day, etc.) basis. The records could then be formatted and/or cleaned before the records are stored in databases 118 that are accessible to components of early warning framework 120. One or more data sources 202 may also, or instead, serve as one or more databases 118 from which extraction engine 204, detection engine 206, prioritization engine 208, and/or other components of early warning framework 120 retrieve unstructured data 210.

Extraction engine 204 uses one or more parts-of-speech (PoS) extractors 212 to extract a number of candidate topics 214 from unstructured data 210. For example, PoS extractors 212 could use a number of natural language processing (NLP) techniques to divide unstructured data 210 into a set of individual sentences. PoS extractors 212 could optionally supplement each sentence with the surrounding context (e.g., sentences occurring before or after the sentence in the same paragraph) and/or remove sentences that lack semantic meaning (e.g., sentences that lack certain PoS) from the set. PoS extractors 212 could then extract candidate topics 214 as sequences of tokens or words that match certain PoS patterns within the sentences and/or surrounding context.

In one or more embodiments, PoS extractors 212 generate candidate topics 214 that include entities, relationships that link the entities in unstructured data 210, and/or modifiers that are applied to the entities or relationships. For example, PoS extractors 212 could identify the entities using subject-object pairs, noun phrases, and/or other types of PoS patterns that include nouns. PoS extractors 212 could also identify relationships between or among the entities using verb phrases, gerund phrases, infinitive phrases, and/or other types of PoS patterns that include verbs. PoS extractors 212 could further identify modifiers that are applied to the entities or relationships as adjectives, adverbs, prepositional phrases, participial phrases, and/or other PoS patterns that can be used to modify nouns and/or verbs.

Detection engine 206 applies one or more machine learning models 220 to candidate topics 214 to identify a subset of candidate topics 214 as activities of interest 218 for a given domain. In one or more embodiments, an activity of interest includes a candidate topic representing an event that is potentially relevant to operations or risk assessment within the domain. For example, activities of interest for a pharmaceutical domain could include (but are not limited to) drug discovery, drug development, pre-clinical development, clinical trials, product approval, drug patents, generic drug production, drug pricing, introduction of drugs into new markets, and/or other significant events or milestones related to pharmaceutical drugs or companies.

More specifically, detection engine 206 and/or machine learning models 220 use a variety of techniques to match entities, relationships, and/or modifiers in candidate topics 214 to specific words, phrases, and/or definitions related to a given domain. For example, detection engine 206 and/or one or more machine learning models 220 could identify an entity and/or relationship in a candidate topic by matching one or more words in the candidate topic to a regular expression. In a second example, detection engine 206 and/or one or more machine learning models 220 could use a named entity recognition (NER) technique to identify named entities that are relevant to a given domain in candidate topics 214. In a third example, detection engine 206 and/or one or more machine learning models 220 could use a taxonomy for the domain to identify entities or relationships that are relevant to the domain in candidate topics 214. In a fourth example, detection engine 206 and/or one or more machine learning models 220 could use word vector embeddings and/or other semantic representations of words to determine the semantic meaning of a word or phrase in a given candidate topic.

As mentioned above, candidate topics 214 may be generated and/or supplemented using adjacent sentences and/or other semantic context in unstructured data 210. In turn, detection engine 206 and/or one or more machine learning models 220 may leverage this surrounding context in identifying candidate topics 214 that represent activities of interest 218 for a given domain. For example, machine learning models 220 could include a Transformer, Bidirectional Encoder Representations from Transformers (BERT), Generative Pre-trained Transformer (GPT), and/or another type of language model that is pre-trained or fine-tuned to answer questions related to the domain. Detection engine 206 could input a question related to an activity of interest for the domain, along with some or all candidate topics 214 and surrounding context into the language model, and the language model could identify one or more candidate topics 214 and/or one or more portions of a given candidate topic that include answers to the question. The set of answers to the question could then be included in the set of activities of interest 218 for the domain.

In another example, detection engine 206 and/or one or more machine learning models 220 could use a TextRank and/or other text summarization technique to generate a summary of a candidate topic from multiple contexts. The summary could then be used as a new version of the candidate topic that is further analyzed by additional machine learning models 220 to determine whether the candidate topic represents an activity of interest for a given domain.

Continuing with the above example, the summarization engine could also, or instead, be used to generate a summary of multiple documents that include content related to a given domain. The summary could be converted into one or more questions that are then used to train the question-answering model in the previous example, thereby allowing the question-answering model to learn to answer questions related to the domain.

After activities of interest 218 are identified in candidate topics 214, prioritization engine 208 uses one or more machine learning models 222 to generate scores 224 related to the identified activities of interest 218 in candidate topics 214. In one or more embodiments, each of scores 224 represents an estimated impact of a corresponding activity of interest on a given domain (e.g., the pharmaceutical industry) or a category within the domain (e.g., drug pricing). For example, a higher score for an activity of interest identified for drug pricing in the pharmaceutical industry could indicate a higher potential impact of the activity of interest on drug prices, and a lower score for the activity of interest could indicate lower impact of the activity of interest on drug prices.

In some embodiments, machine learning models 222 include classifiers and/or other types of machine learning models that are trained to recognize specific types of issues, events, and/or categories related to a given domain. For example, one or more machine learning models 222 could be trained to assess risks related to drug approval or release in the pharmaceutical industry. These risks could include, but are not limited to, potential to cause side effects, fatalities, paralysis, amputations, disfigurement or scarring, sensory impairment, birth defects, addiction or dependency, and/or internal injuries. Scores outputted by these machine learning model(s) could range from 0 to 1 and represent likelihoods of interfering with drug approval or release. A higher score outputted by a machine learning model could indicate a higher likelihood of the corresponding activity of interest negatively impacting drug approval or release, and a lower score outputted by a machine learning model could indicate a lower likelihood of the corresponding activity of interest negatively impacting drug approval or release. Different machine learning models 222 could be trained to generate scores for different domains and/or categories, or the same machine learning model could be used to generate scores 224 for multiple domains and/or categories.

After scores 224 are generated for activities of interest 218, prioritization engine 208 produces one or more rankings 226 of activities of interest 218 by one or more scores 224. For example, prioritization engine 208 could rank activities of interest 218 by scores 224 for each category related to a given domain. In another example, prioritization engine 208 could aggregate multiple scores 224 representing the impact of a given activity of interest (e.g., using an average, a weighted average, an additional machine learning model included in machine learning models 222, etc.) on multiple categories within a domain into an overall score for the activity of interest. Prioritization engine 208 could then rank activities of interest 218 by descending overall score, so that activities of interest 218 with the highest overall impact on operations or risk within the domain are at the top of the ranking and activities of interest 218 with the lowest overall impact on operations or risk within the domain are at the bottom of the ranking.

Prioritization engine 208 additionally uses rankings 226 to identify one or more activities 232 with the highest scores 224. For example, prioritization engine 208 could obtain, from the top of one or more rankings 226, a pre-specified number of activities 232 with the highest scores 224 and/or a variable number of activities 232 with scores 224 that exceed a numeric, quantile, and/or another threshold (e.g., activities 232 with scores that are at or above the $99^{th}$ percentile, activities 232 with scores that indicate at least a 95% likelihood of impacting operations or risk within the domain, etc.).

GUI 124 then generates one or more alerts 230 that include that the identified activities 232. In some embodiments, alerts 230 indicate that activities 232 are likely to impact operations or risk within the domain and/or specific categories within the domain. For example, alerts 230 could be used as early warnings of events that have the potential to disrupt or impact a given domain and/or category. Each of alerts 230 include a description of a corresponding activity, one or more scores 224 generated by machine learning models 222 for the activity, the domain and/or category associated with each score, additional content related to the activity (e.g., documents in which the activity is mentioned, times at which the documents were generated or posted, a summary of content related to the activity, etc.), topics or sentiments associated with the additional content, sources of the additional content (e.g., social media, news, government, etc.), timestamps representing the times at which the content was posted or published, and/or other information that can be used to assess the activity's relevance or importance to the domain.

A user interacting with GUI 124 may use alerts 230 to make decisions or perform actions within the domain in response to the corresponding activities 232. For example, the user could use information in an alert related to the introduction of a drug into a market to buy or sell stock in the company producing the drug, challenge the introduction on regulatory grounds, develop a strategy for producing a competing drug, increase or decrease the budget for researching and developing one or more other drugs, and/or perform other actions that account for the information in the alert.

The user may also, or instead, provide feedback 234 related to the quality or relevance of activities 232 with respect to the corresponding categories and/or domains. For example, the user could include an expert in the domain that uses GUI 124 to review alerts 230. After reviewing information related to a given activity in an alert, the user could interact with one or more user-interface elements within GUI 124 to provide a "thumbs up" or "thumbs down" vote, a numeric rating, a probability, and/or other feedback 234 indicating whether or not the corresponding activity is likely to impact operations or risk assessment related to the domain.

In turn, feedback 234 received via GUI 124 is used to improve the performance of PoS extractors 212 and/or machine learning models 220-222. For example, feedback 234 could be aggregated by PoS patterns identified by PoS extractors 212, and candidate topics 214 that match certain PoS patterns and are associated with negative feedback 234 could be filtered by extraction engine 204 to prevent the subsequent generation of alerts 230 based on these candidate topics.

In another example, feedback 234 could be converted into labels that represent a majority "vote" for relevance or lack of relevance of a given activity to a corresponding domain or category (e.g., an activity is assigned a label of 1 if a majority of user feedback 234 indicates it is relevant to the domain or category and a label of 0 otherwise) or a "probability" of relevance of the activity to the domain or category (e.g., an activity is assigned a label between 0 and 1 representing the average of all feedback 234 for the activity and the domain/category). The labels could be inputted with features related to the corresponding activities 232 as training data for one or more machine learning models 220 and/or one or more machine learning models 222. A training technique and/or one or more hyperparameters could then be used to update parameters of the machine learning model(s) so that values outputted by the machine learning model(s) from the features better reflect the corresponding labels.

This iterative execution and updating of components of early warning framework 120 using data from data sources 202 and feedback 234 received via GUI 124 allows early warning framework 120 to adapt to new data and/or domains and improve in performance over time. In particular, filters applied by extraction engine 204, detection engine 206, and prioritization engine 208 allow activities 232 that are potentially relevant to a given domain to be identified from a very large corpus of unstructured data 210, while feedback 234 from experts in the domain allows extraction engine 204, detection engine 206, and prioritization engine 208 to learn the characteristics of activities 232 that are relevant to a given domain or category while ignoring the characteristics of activities 232 that are not relevant to a given domain or category. Thus, when a new activity is mentioned or otherwise captured in unstructured data 210, extraction engine 204, detection engine 206, and prioritization engine 208 can identify the new activity as potentially relevant to the domain based on similarity to prior activities 232 that were deemed relevant to domain and/or lack of similarity to prior activities 232 that were deemed to be not relevant to the domain, even if the new activity has not been encountered before.

Figure 3A:
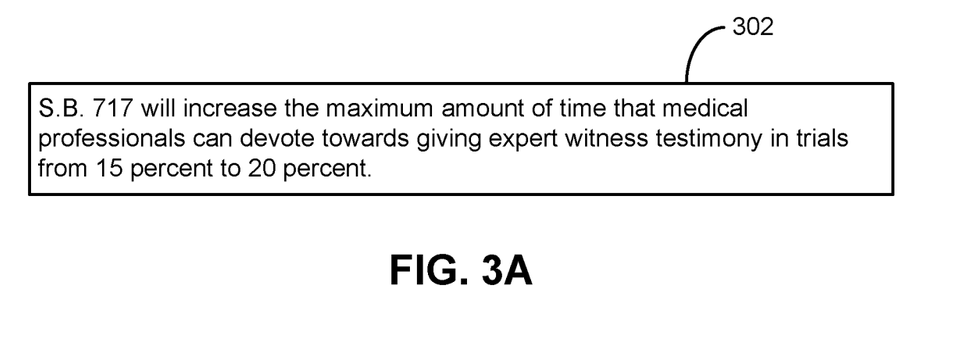
FIG. 3A is an example sentence extracted from unstructured data, according to various embodiments.

FIG. 3A is an example sentence 302 extracted from unstructured data, according to various embodiments. In this example, sentence 302 is extracted from an article that discusses civil justice system issues within a given jurisdiction.

Figure 3B:
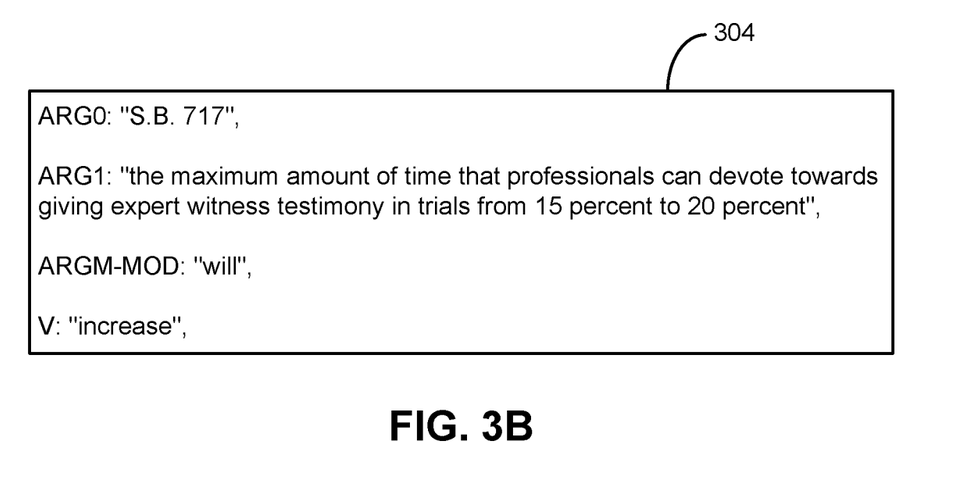
FIG. 3B is an example activity of interest extracted from the sentence of FIG. 3A, according to various embodiments.

FIG. 3B is an example activity of interest 304 extracted from sentence 302 of FIG. 3A, according to various embodiments. As shown, activity of interest 304 includes two arguments of "S.B. 717" and "the maximum amount of time that professionals can devote towards giving expert witness testimony in trials from 15 percent to 20 percent." Activity of interest 304 also includes a modifier of "will" and a verb of "increase." As a result, activity of interest 304 includes a breakdown of sentence 302 into nouns, verbs, modifiers, and/or other PoS.

Activity of interest 304 may be identified as potentially relevant to a legal domain using a number of techniques. For example, a regular expression could be used to identify "S.B" as a representation of a law. In another example, relevance to the legal domain could be established based on keywords or regular expressions related to "expert witness," "testimony," or "trials" in sentence 302. In a third example, a language model could be used to identify one or more portions of sentence 302 as having the answer to the question of "How much time can professionals devote towards giving expert witness testimony in trials?"

Figure 3C:
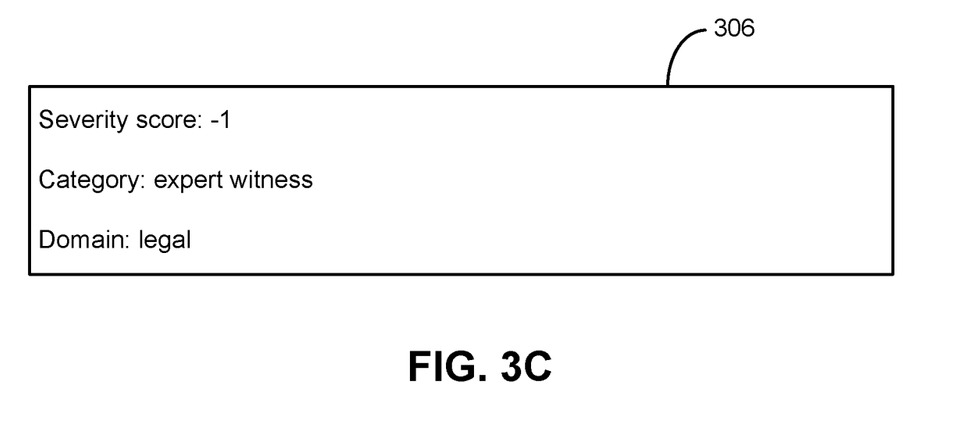
FIG. 3C is an example analysis of the activity of interest extracted from the sentence of FIG. 3A, according to various embodiments.

FIG. 3C is an example analysis 306 of activity of interest 304 extracted from sentence 302 of FIG. 3A, according to various embodiments. As shown, analysis 306 includes a severity score of −1, a category of "expert witness" and a domain of "legal." The severity score reflects the relevance of activity of interest 304 to the category within the domain. For example, the severity score could be generated by a machine learning model that is trained to assess the potential impact of activities of interest on the category of expert witnesses within the legal domain.

Information in analysis 306 may be used to prioritize activity of interest 304 and/or generate an alert related to activity of interest 304. For example, activity of interest 304 could be ranked with other activities of interest by severity score for the same topic and domain, and a number of activities of interest at the top of the ranking (e.g., activities of interest with severity scores that indicate the highest relevance or impact to the topic and domain) could be selected for inclusion in one or more alerts. User feedback related to the alert(s) could then be used to update machine learning models or techniques used to generate or select subsequent activities of interests and/or severity scores for the category and/or domain.

Figure 4:
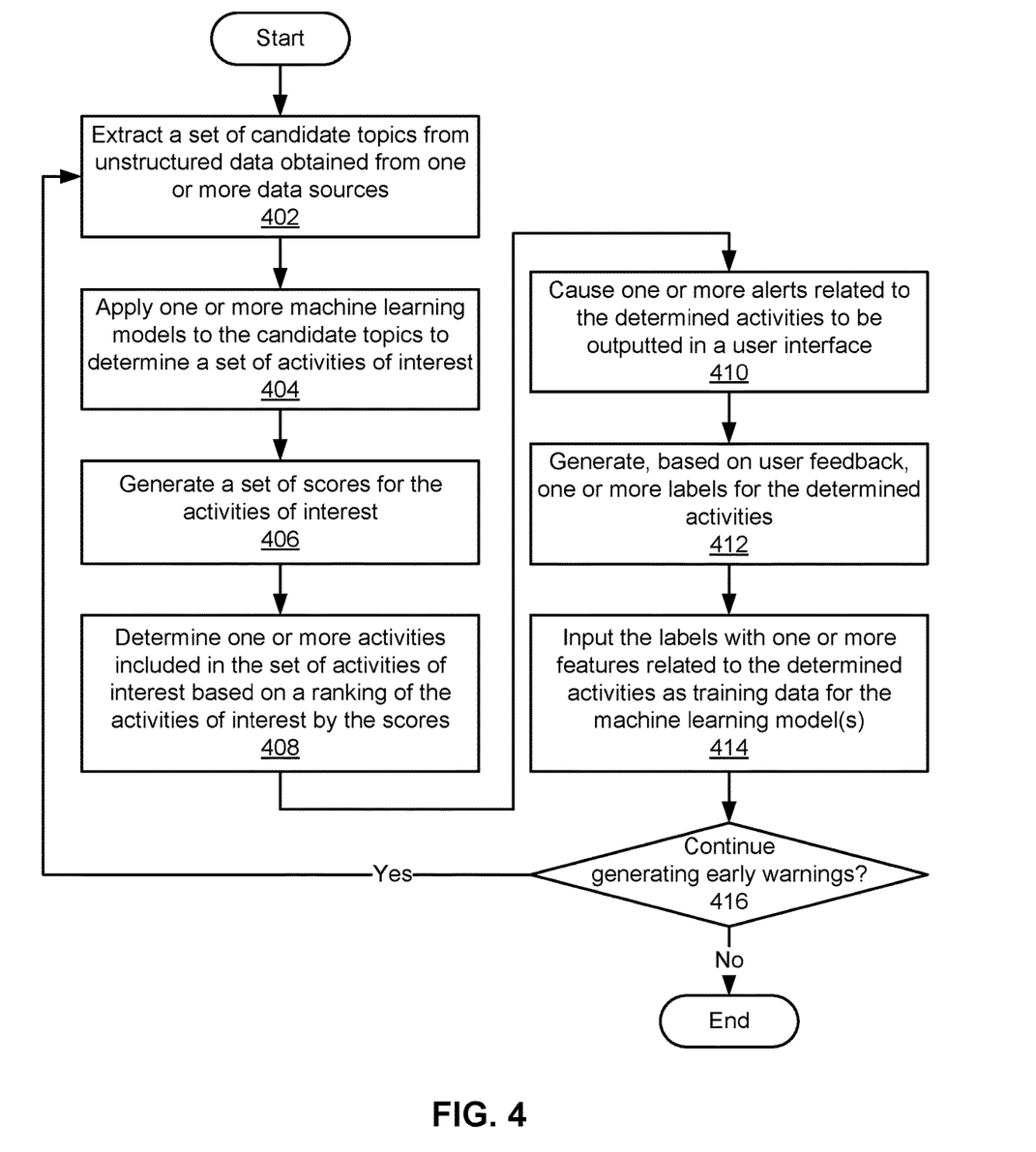
FIG. 4 is a flow diagram of method steps for processing unstructured data, according to various embodiments.

FIG. 4 is a flow diagram of method steps for processing unstructured data, according to various embodiments. Although the method steps are described in conjunction with the systems of FIGS. 1-2, persons skilled in the art will understand that any system configured to perform the method steps, in any order, is within the scope of the present invention.

As shown, early warning framework 120 extracts 402 a set of candidate topics from unstructured data obtained from one or more data sources. For example, the unstructured data could be periodically and/or continuously queried, scraped, or otherwise retrieved from one or more APIs, public data sources, social media databases, news sources, and/or other types of data sources. The unstructured data could include text-based content such as news articles, press releases, social media posts, comments, reviews, sensor readings, and/or financial data. The candidate topics could be extracted from the unstructured data by matching phrases in the unstructured data to one or more PoS patterns. Each candidate topic could include one or more entities, one or more relationships linking the entities, and/or one or more modifiers applied to the entities and/or relationships.

Next, early warning framework 120 applies 404 one or more machine learning models to the candidate topics to determine a set of activities of interest. These activities of interest may include statements, events, or facts that are potentially relevant to a particular domain. For example, early warning framework 120 could use the machine learning model(s) to match one or more words included in a candidate topic to a regular expression representing a key word or phrase in the domain, a named entity related to the domain, and/or an entity in a taxonomy for the domain. In another example, early warning framework 120 could use vector embeddings outputted by one or more word embedding models to identify a semantic similarity between a first word, phrase, sentence, and/or collection of tokens in a candidate topic and a second word, phrase, sentence, and/or collection of tokens with a known semantic meaning. In a third example, early warning framework 120 could identify an activity of interest included in the set of candidate topics based on a semantic context for the activity of interest and a question inputted into a language model. In a fourth example, early warning framework 120 could generate an activity of interest as a summary of a subset of unstructured data associated with one or more candidate topics.

Early warning framework 120 also generates 406 a set of scores for the activities of interest. Each score represents an estimated impact of a corresponding activity of interest on one or more operations within a domain. For example, early warning framework 120 could apply one or more classifiers and/or other types of machine learning models to the activities of interest, surrounding context (e.g., sentences before or after the activities of interest in the unstructured data, sources of unstructured data from which the activities of interest were identified, recency of the unstructured data, the number of mentions of each activity of interest in the unstructured data, etc.), and/or other features related to the activities of interest. Each machine learning model could output one or more scores for a given activity of interest, with each score representing the predicted likelihood that the activity of interest will impact operations within the domain and/or within a category associated with the domain.

Early warning framework 120 then determines 408 one or more activities included in the set of activities of interest based on a ranking of the activities of interest by the scores. For example, early warning framework 120 could rank the activities of interest by descending predicted likelihood of impacting a given category of operations within the domain. Early warning framework 120 could use the ranking to identify a pre-specified number of activities with the highest likelihood of impacting the category of operations and/or a variable number of activities with likelihoods that meet or exceed a threshold.

Early warning framework 120 causes 410 one or more alerts related to the determined activities to be outputted in a user interface. For example, early warning framework 120 could cause GUI 124 to produce one or more notifications, visualizations, messages, and/or other types of output related to each of the activities determined in operation 408. Each alert could indicate that a corresponding activity has been identified as a potential disruption or impact to operations within the domain and/or a category of operations within the domain.

Early warning framework 120 further generates 412, based on user feedback, one or more labels for the determined activities and inputs 414 the labels with one or more features related to determined activities as training data for the machine learning model(s). For example, early warning framework 120 could receive the user feedback as binary, numeric, and/or other user input via the user interface. Early warning framework 120 could aggregate the user feedback for a given activity, category, and/or domain into a label that represents a majority "vote" on the user-specified relevance of the activity to the domain (or category), a likelihood that the activity is relevant to the domain (or category), and/or another aggregated value. Early warning framework 120 could then update the parameters of machine learning models used to determine the activities of interest and/or generate scores for the activities of interest so that the output produced by the machine learning models for a given activity of interest better reflects the corresponding label.

Early warning framework 120 may repeat operations 402-414 to continue generating 416 early warnings of potentially disruptive events. For example, early warning framework 120 may periodically and/or continuously collect unstructured data from the data sources; perform processing, filtering, and/or scoring related to the unstructured data; output alerts related to one or more activities of interest identified in the unstructured data; and/or update machine learning models used to identify the activities of interest based on user feedback collected in response to the alerts. Thus, early warning framework 120 is able to generate timely alerts that warn users of potentially disruptive events while improving the accuracy or relevance of the alerts over time.

In sum, the disclosed techniques identify activities that are likely to impact operations or decisions within a given domain and automatically alert users involved in the domain to the activities. A large corpus of unstructured data is collected and/or aggregated from data sources that are not restricted to specific domains or entities, and a number of NLP and/or text-mining techniques are used to extract a set of candidate topics from the unstructured data. Each candidate topic captures a number of entities, a relationship linking the entities, and/or a modifier associated with an entity or relationship. Additional NLP, text-mining, and/or machine learning techniques are then used to identify a subset of candidate topics as activities of interest for a given domain. One or more machine learning models are then used to generate a set of scores for the activities of interest, where each score represents an estimated relevance of an activity of interest to the domain and/or a category within the domain. The activities of interest are ranked by the scores, and a subset of activities of interest with the highest estimated relevance to the domain and/or one or more categories within the domain are identified using the ranking. Alerts that include the activities of interest and/or surrounding context are then outputted to the users, and feedback from the users is used to improve the performance of models and/or techniques used to generate the candidate topics, activities of interest, scores, and/or alerts.

One technical advantage of the disclosed techniques relative to the prior art is that activities are automatically identified as potentially relevant to operations within a given domain via operations that efficiently process and filter a large corpus of unstructured data. The disclosed techniques thus allow warnings or alerts of the activities to be generated in a timely manner instead of performing time- or resource-intensive operations such as analyzing the entire corpus of unstructured data using one or more machine learning models and/or human reviewers. Another technical advantage of the disclosed techniques is the ability to adapt techniques or machine learning models used to process and filter the unstructured data to different domains and/or the ability to improve the accuracy of the alerts based on minimal user feedback. These technical advantages provide one or more technological improvements over prior art approaches.

1. In some embodiments, a computer-implemented method for processing unstructured data comprises applying one or more machine learning models to a set of candidate topics extracted from the unstructured data to determine a set of activities of interest included in the set of candidate topics, generating a set of scores for the set of activities of interest, wherein each score included in the set of scores represents an estimated impact of a corresponding activity of interest on one or more operations within a domain, determining one or more activities included in the set of activities of interest based on a ranking of the set of activities of interest by the set of scores, and causing one or more alerts to be outputted in a user interface, wherein each of the one or more alerts is associated with a potential event related to the one or more activities.

2. The computer-implemented method of clause 1, further comprising generating, based on user feedback, one or more labels for the one or more activities, wherein each of the one or more labels represents a relevance of a corresponding activity included in the one or more activities to the one or more operations within the domain, and inputting the one or more labels with one or more features related to the one or more activities as training data for the one or more machine learning models.

3. The computer-implemented method of clauses 1 or 2, wherein the user feedback is received as binary user input via the user interface.

4. The computer-implemented method of any of clauses 1-3, further comprising extracting the set of candidate topics from the unstructured data.

5. The computer-implemented method of any of clauses 1-4, further comprising extracting the set of candidate topics from the unstructured data based on one or more parts-of-speech patterns identified in the unstructured data.

6. The computer-implemented method of any of clauses 1-5, wherein applying the one or more machine learning models to the set of candidate topics comprises at least one of matching one or more words included in the unstructured data to a regular expression, identifying a named entity included in the unstructured data, identifying an entity included in the unstructured data based on a taxonomy for the domain, or identifying a semantic similarity between one or more first words and one or more second words included in the unstructured data.

7. The computer-implemented method of any of clauses 1-6, wherein applying the one or more machine learning models to the set of candidate topics comprises determining an activity of interest based on a semantic context for a candidate topic included in the set of candidate topics and a question inputted into a language model.

8. The computer-implemented method of any of clauses 1-7, wherein applying the one or more machine learning models to the set of candidate topics comprises generating an activity of interest based on a summary of a subset of the unstructured data associated with one or more candidate topics included in the set of candidate topics.

9. The computer-implemented method of any of clauses 1-8, wherein the unstructured data is obtained from at least one of a public data source, a private data source, a social media database, and a news source.

10. The computer-implemented method of any of clauses 1-9, wherein generating the set of scores comprises applying one or more additional machine learning models to each activity of interest included in the set of activities of interest to assign a score to the activity of interest, wherein the score is based on a category related to the domain.

11. In some embodiments, a non-transitory computer readable medium stores instructions that, when executed by a processor, cause the processor to perform the steps of applying one or more machine learning models to a set of candidate topics extracted from unstructured data to determine a set of activities of interest included in the set of candidate topics, wherein the set of activities of interest includes a set of entities related to a domain, generating a set of scores for the set of activities of interest, wherein each score included in the set of scores represents an estimated impact of a corresponding activity of interest on one or more operations within the domain, determining one or more activities included in the set of activities of interest based on a ranking of the set of activities of interest by the set of scores, and causing one or more alerts to be outputted in a user interface, wherein each of the one or more alerts is associated with a potential event related to the one or more activities.

12. The non-transitory computer readable medium of clause 11, wherein the instructions further cause the processor to perform the steps of generating, based on user feedback, one or more labels for the one or more activities, wherein each of the one or more labels represents a relevance of a corresponding activity included in the one or more activities to the one or more operations within the domain, and inputting the one or more labels with one or more features related to the one or more activities as training data for the one or more machine learning models.

13. The non-transitory computer readable medium of clauses 11 or 12, wherein the one or more labels include a binary value representing a user-specified relevance of the corresponding activity to the one or more operations within the domain.

14. The non-transitory computer readable medium of any of clauses 11-13, wherein the one or more labels include a value representing a likelihood that an activity is relevant to the one or more operations within the domain.

15. The non-transitory computer readable medium of any of clauses 11-14, wherein the instructions further cause the processor to perform the step of extracting the set of candidate topics from the unstructured data by identifying a first entity, a second entity, and a relationship between the first entity and the second entity based on a parts-of-speech pattern identified in a sentence included in the unstructured data.

16. The non-transitory computer readable medium of any of clauses 11-15, wherein applying the one or more machine learning models to the set of candidate topics comprises matching one or more words included in the unstructured data to at least one of a regular expression, a named entity associated with the domain, or an entity in a taxonomy for the domain.

17. The non-transitory computer readable medium of any of clauses 11-16, wherein applying the one or more machine learning models to the set of candidate topics comprises determining an activity of interest based on a semantic context for a candidate topic included in the set of candidate topics and a question inputted into a language model.

18. The non-transitory computer readable medium of any of clauses 11-17, wherein applying the one or more machine learning models to the set of candidate topics comprises generating an activity of interest based on a summary of a subset of the unstructured data associated with one or more candidate topics included in the set of candidate topics.

19. The non-transitory computer readable medium of any of clauses 11-18, wherein a first candidate topic included in the set of candidate topics includes a first entity, a second entity, a relationship between the first entity and the second entity, and a modifier.

20. In some embodiments, a system comprises a memory that stores instructions, and a processor that is coupled to the memory and, when executing the instructions, is configured to extract a set of candidate topics from unstructured data based on one or more parts-of-speech patterns identified in the unstructured data, apply one or more machine learning models to the set of candidate topics to determine a set of activities of interest included in the set of candidate topics, wherein the set of activities includes a set of entities related to a domain, generate a set of scores for the set of activities of interest, wherein each score included in the set of scores represents an estimated impact of a corresponding activity of interest on one or more operations within the domain, determine one or more activities included in the set of activities of interest based on a ranking of the set of activities of interest by the set of scores, and cause one or more alerts to be outputted in a user interface, wherein each of the one or more alerts is associated with a potential event related to the one or more activities.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing unstructured data, comprising:

executing one or more trained machine learning models to match a set of candidate topics extracted from the unstructured data to a set of activities of interest for a set of domains based on (i) representations of entities, relationships, and modifiers that correspond to the set of activities of interest and are included in the one or more trained machine learning models and (ii) input that includes semantic representations of the set of candidate topics and semantic context that is included in the unstructured data and associated with the set of candidate topics;

executing one or more additional trained machine learning models to generate a set of scores for the set of activities of interest, wherein each machine learning model included in the one or more additional trained machine learning models generates one or more scores that are included in the set of scores and represent an estimated impact of one or more corresponding activities of interest on a different category within a domain;

determining one or more activities included in the set of activities of interest based on a ranking of the set of activities of interest by the set of scores;

causing one or more alerts to be outputted in a user interface, wherein each of the one or more alerts is associated with a potential event related to the one or more activities;

aggregating user feedback associated with the one or more alerts by the one or more activities and one or more categories associated with the one or more additional trained machine learning models into one or more labels, wherein each of the one or more labels represents a relevance of a corresponding activity included in the one or more activities to a category included in the one or more categories within the domain;

retraining the one or more trained machine learning models based on training data that includes the one or more labels and one or more inputs related to the one or more activities; and for each category included in the one or more categories, retraining a corresponding machine learning model included in the one or more additional trained machine learning models based on additional training data that includes a label that is associated with the category and included in the one or more labels.

2. The computer-implemented method of claim 1, wherein each of the one or more labels includes a majority vote associated with the relevance of the corresponding activity to the category within the domain.

3. The computer-implemented method of claim 1, wherein the user feedback is received as binary user input via the user interface.

4. The computer-implemented method of claim 1, further comprising extracting the set of candidate topics from the unstructured data.

5. The computer-implemented method of claim 4, further comprising extracting the set of candidate topics from the unstructured data based on one or more parts-of-speech patterns identified in the unstructured data.

6. The computer-implemented method of claim 1, wherein executing the one or more trained machine learning models comprises at least one of:

matching one or more words included in the unstructured data to a regular expression;

identifying a named entity included in the unstructured data;

identifying an entity included in the unstructured data based on a taxonomy for the domain; or identifying a semantic similarity between one or more first words and one or more second words included in the unstructured data.

7. The computer-implemented method of claim 1, wherein executing the one or more trained machine learning models comprises determining an activity of interest based on the semantic context for a candidate topic included in the set of candidate topics and a question inputted into a language model.

8. The computer-implemented method of claim 1, wherein executing the one or more trained machine learning models comprises generating an activity of interest based on a summary of a subset of the unstructured data associated with one or more candidate topics included in the set of candidate topics.

9. The computer-implemented method of claim 1, wherein the unstructured data is obtained from at least one of a public data source, a private data source, a social media database, and a news source.

10. The computer-implemented method of claim 1, wherein executing the one or more additional trained machine learning models comprises inputting each activity of interest included in the set of activities of interest and a context that is associated with the activity of interest and extracted from the unstructured data into the one or more additional trained machine learning models.

11. A non-transitory computer readable medium storing instructions that, when executed by a processor, cause the processor to perform the steps of:

executing one or more trained machine learning models to match a set of candidate topics extracted from unstructured data to a set of activities of interest for a set of domains based on (I) representations of entities, relationships, and modifiers that correspond to the set of activities of interest and are included in the one or more trained machine learning models and (ii) input that includes semantic representations of the set of candidate topics and semantic context that is included in the unstructured data and associated with the set of candidate topics;

executing one or more additional trained machine learning models to generate a set of scores for the set of activities of interest, wherein each machine learning model included in the one or more additional trained machine learning models generates one or more scores that are included in the set of scores and represent an estimated impact of one or more corresponding activities of interest on a different category within a domain;

determining one or more activities included in the set of activities of interest based on a ranking of the set of activities of interest by the set of scores;

causing one or more alerts to be outputted in a user interface, wherein each of the one or more alerts is associated with a potential event related to the one or more activities;

aggregating user feedback associated with the one or more alerts by the one or more activities and one or more categories associated with the one or more additional trained machine learning models into one or more labels, wherein each of the one or more labels represents a relevance of a corresponding activity included in the one or more activities to a category included in the one or more categories within the domain;

retraining the one or more trained machine learning models based on training data that includes the one or more labels and one or more inputs related to the one or more activities; and for each category included in the one or more categories, retraining a corresponding machine learning model included in the one or more additional trained machine learning models based on additional training data that includes a label that is associated with the category and included in the one or more labels.

12. The non-transitory computer readable medium of claim 11, wherein each of the one or more labels includes a probability of the relevance of the corresponding activity to the category within the domain.

13. The non-transitory computer readable medium of claim 11, wherein each of the one or more labels includes a binary value representing a user-specified relevance of the corresponding activity to the category within the domain.

14. The non-transitory computer readable medium of claim 11, wherein the one or more labels include a value representing a likelihood that an activity is relevant to the category within the domain.

15. The non-transitory computer readable medium of claim 11, wherein the instructions further cause the processor to perform the step of extracting the set of candidate topics from the unstructured data by identifying a first entity, a second entity, and a first relationship between the first entity and the second entity based on a parts-of-speech pattern identified in a sentence included in the unstructured data.

16. The non-transitory computer readable medium of claim 11, wherein executing the one or more trained machine learning models comprises matching one or more words included in the unstructured data to at least one of a regular expression, a named entity associated with the domain, or an entity in a taxonomy for the domain.

17. The non-transitory computer readable medium of claim 11, wherein executing the one or more trained machine learning models comprises determining an activity of interest based on the semantic context for a candidate topic included in the set of candidate topics and a question inputted into a language model.

18. The non-transitory computer readable medium of claim 11, wherein executing the one or more trained machine learning models comprises generating an activity of interest based on a summary of a subset of the unstructured data associated with one or more candidate topics included in the set of candidate topics.

19. The non-transitory computer readable medium of claim 11, wherein a first candidate topic included in the set of candidate topics includes a first entity, a second entity, a first relationship between the first entity and the second entity, and a first modifier.

20. A system, comprising:

a memory that stores instructions, and a processor that is coupled to the memory and, when executing the instructions, is configured to:

extract a set of candidate topics from unstructured data based on one or more parts-of-speech patterns identified in the unstructured data;

execute one or more trained machine learning models to match the set of candidate topics to a set of activities of interest for a set of domains based on (i) representations of entities, relationships, and modifiers that correspond to the set of activities of interest and are included in the one or more trained machine learning models and (ii) input that includes semantic representations of the set of candidate topics and semantic context that is included in the unstructured data and associated with the set of candidate topics;

execute one or more additional trained machine learning models to generate a set of scores for the set of activities of interest, wherein each machine learning model included in the one or more additional trained machine learning models generates one or more scores that are included in the set of scores and represent an estimated impact of one or more corresponding activities of interest on a different category within a domain;

determine one or more activities included in the set of activities of interest based on a ranking of the set of activities of interest by the set of scores;

cause one or more alerts to be outputted in a user interface, wherein each of the one or more alerts is associated with a potential event related to the one or more activities;

aggregate user feedback associated with the one or more alerts by the one or more activities and one or more categories associated with the one or more additional trained machine learning models into one or more labels, wherein each of the one or more labels represents a relevance of a corresponding activity included in the one or more activities to a category included in the one or more categories within the domain;

retrain the one or more trained machine learning models based on training data that includes the one or more labels and one or more inputs related to the one or more activities; and for each category included in the one or more categories, retrain a corresponding machine learning model included in the one or more additional trained machine learning models based on additional training data that includes a label that is associated with the category and included in the one or more labels.

* * * * *

UNITED STATES PATENT AND TRADEMARK OFFICE
CERTIFICATE OF CORRECTION

| | | |
|---|---|---|
| PATENT NO. | : 11,989,677 B2 | Page 1 of 1 |
| APPLICATION NO. | : 17/179197 | |
| DATED | : May 21, 2024 | |
| INVENTOR(S) | : Sanjay Rajagopalan and Xiwei Zhou | |

It is certified that error appears in the above-identified patent and that said Letters Patent is hereby corrected as shown below:

On the Title Page

Item (71) Applicant:
Please delete "ViANAI SYSTEMS, INC., Palo Alto, CA (US)" and insert --VIANAI SYSTEMS, INC., Palo Alto, CA (US)--;

In the Claims

Column 17, Claim 11, Line 36, please delete "(I)" and insert --(i)--.

Signed and Sealed this
Second Day of July, 2024

Katherine Kelly Vidal
*Director of the United States Patent and Trademark Office*